United States Patent [19]

Ghaffari

[11] Patent Number: 5,751,220
[45] Date of Patent: May 12, 1998

[54] SYNCHRONIZED NETWORK OF ELECTRONIC DEVICES INCLUDING BACK-UP MASTER UNITS

[75] Inventor: Touraj Ghaffari, Boca Raton, Fla.

[73] Assignee: Sensormatic Electronics Corporation, Deerfield Beach, Fla.

[21] Appl. No.: 502,827

[22] Filed: Jul. 14, 1995

[51] Int. Cl.$^6$ ........................................................ H04L 7/00
[52] U.S. Cl. ................... 340/825.21; 340/825.51; 340/825.14; 340/825.07; 375/357; 370/507
[58] Field of Search ................. 340/825.21, 825.02, 340/825.5, 825.51, 825.14, 825.07, 825.2, 825.52, 870.16, 870.15, 825.05; 235/385; 370/85.11, 85.15, 85.1, 103, 94.2, 503, 507, 220; 395/182.09; 375/356, 357

[56] References Cited

U.S. PATENT DOCUMENTS

| | | | |
|---|---|---|---|
| 4,521,871 | 6/1985 | Galdun et al. | 395/182.09 |
| 4,677,614 | 6/1987 | Circo | 370/85.15 |
| 4,691,202 | 9/1987 | Denne et al. | 340/825.5 X |
| 4,709,347 | 11/1987 | Kirk | 395/200.19 |
| 4,807,259 | 2/1989 | Yamanaka et al. | 370/85.1 X |
| 4,988,989 | 1/1991 | Goto | 340/825.21 |
| 5,166,678 | 11/1992 | Warrior | 340/870.15 |
| 5,231,273 | 7/1993 | Caswell et al. | 235/385 |
| 5,434,862 | 7/1995 | Lokhoff | 370/85.11 |
| 5,537,105 | 7/1996 | Marsh et al. | 340/825.5 X |

OTHER PUBLICATIONS

Tobagi, Fouad A.; "Multiaccess protocols in Packet Communication Systems"; *IEEE Transactions on Communications*, vol. Com–28, No. 4, Apr. 1980, pp. 468–488.

*Primary Examiner*—Michael Horabik
*Assistant Examiner*—William H. Wilson, Jr.
*Attorney, Agent, or Firm*—Robin, Blecker, Daley, Driscoll

[57] ABSTRACT

Operation of a plurality of electronic devices is synchronized. The plurality of devices include a master unit and a plurality of other units, and the master unit transmits a synchronizing signal to at least one of the other units at predetermined intervals. Each of at least two of the other units detects whether a synchronizing signal is received at the respective unit within a predetermined period of time. If not, the respective unit changes from a slave mode of operation to a master mode of operation. Contention between the two or more potential back-up master units is resolved based on priority in a daisy-chain arrangement or by providing different time-out watch-dog periods for the potential back-up devices.

25 Claims, 11 Drawing Sheets

(DAISY-CHAIN)

(HYBRID-MASTER)

(HYBRID-SLAVE)

(BUS)

5,751,220

SYNCHRONIZED NETWORK OF ELECTRONIC DEVICES INCLUDING BACK-UP MASTER UNITS

FIELD OF THE INVENTION

The invention is concerned with methods and apparatus for synchronizing the respective times of operation of a plurality of electronic devices.

BACKGROUND OF THE INVENTION

Co-pending patent application Ser. No. 08/437,313, pending entitled "Zone-based Asset Tracking and Control System" (which has a common assignee and a common inventor with the present application), discloses an integrated system for automatically keeping track of the location of individuals or objects by means of transponders attached to the individuals or objects. The disclosure of application Ser. No. 08/437,313 pending is incorporated herein by reference. The asset tracking system disclosed in that application may be considered a type of electronic article surveillance system which detects multi-bit marker identification signals generated by suitable markers in addition to detecting the presence of the markers.

An overview of the asset tracking system disclosed in the aforesaid co-pending patent application will now be provided with reference to FIG. 1. In FIG. 1, reference numeral 50 generally indicates an asset tracking system. The system 50 includes a group of antennas 52 installed in association with a portal or doorway. The portal antennas 52 are arranged to receive signals generated by a marker 54. A marker signal reader device 56 is connected to the portal antennas 52. The reader 56 controls operation of the portal antennas 52 and reads data present in the signal generated by the marker 54. The reader 56 also receives data from, and may provide control signals for controlling, other devices installed at the portal. These other devices are represented by a block 58, and may include an electro-mechanical door lock, a biometric reading unit, status indicator lights, or the like.

The reader 56 is also connected to exchange data with a local control module 60. Data provided from the reader 56 to the local control module 60 includes individual or asset identification data transmitted from the marker 54 and received by the reader 56 through the portal antennas 52. Data provided from the control module 60 to the reader 56 may include appropriate commands, including commands permitting passage of an individual or asset through the portal.

The control module 60 is connected to exchange data with several other readers like the reader 56 shown in FIG. 1. The control module 60 also controls a video camera 62 and a VCR 64. The local control module 60 is connected for data communication with a host computer 66. The host computer 66 is interfaced with a printer 67 which may be used to print reports derived from a database stored in the host computer 66. The host 66 is connected to other local control modules in additional to the local control module 60 shown in the FIG. 1. The number of other local control modules may be large, amounting to several hundred in some cases. Each of the local control modules may be connected to gather data from a respective group of readers comprising several readers. Accordingly, the total number of readers in the system may be quite large, amounting in some embodiments to more than a thousand readers, each connected to receive signals from a respective antenna installation or installations at one or more portals.

Data indicating passage of individuals or assets through the various portals is uploaded via the local control modules to computer 66 to provide a comprehensive and virtually real-time database record of movement of individuals and assets bearing the transponders used in the system.

In a preferred implementation of the system 50, the transponders used as the markers 54 are of the types provided by Texas Instruments in connection with its "TIRIS" automatic identification system. This type of transponder is not provided with a battery or any other type of internal power source. Rather, an interrogation signal is transmitted from the portal antennas 52 to stimulate the transponder to transmit its unique identification signal. The interrogation signal is also a radiated power signal which charges up a power storage capacitor within the transponder. The stored power is then used by the transponder to transmit the transponder's identification signal.

A typical interrogation/response cycle for the "TIRIS" transponder is shown in FIG. 2. The horizonal axis in FIG. 2 represents elapsed time, while the vertical axis represents the state of charging of the transponder's storage capacitor.

During the time period from time T1 to time T2, the interrogation signal/power burst is transmitted from the antenna 52, and the transponder's power storage capacitor is accordingly charged up during this time period. Then, during the period from time T2 to time T3, the stored power is used by the transponder to transmit a modulated identification signal using a frequency shift keying system in which one of the transmitted frequencies is the same as the frequency of the interrogation/power signal. The period between time T3 and time T4 is reserved for signal processing or the like at reader 56, and then the time T4 marks the beginning of another interrogation/response cycle.

A problem encountered with this type of transponder system is the need to synchronize operations of readers which control neighboring antenna installations. In particular, if the interrogation signal transmitted from one antenna coincides in time with the marker identification signal transmitted by a marker that has just been interrogated by a neighboring antenna, then the marker identification signal may be interfered with or "jammed" by the coincident neighboring interrogation signal.

According to one known technique for attempting to solve this problem, a reader, or another device, is designated to be a "master" device which transmits timing or synchronizing signals to all of the readers in the system, or to all readers in a group of neighboring readers. The readers acknowledge the synchronization signal and transmit interrogation signals only at a timing determined in accordance with the synchronizing signals transmitted by the master unit. A disadvantage of this technique is that a large part or all of the asset control system can be disabled if the master unit happens to go out of service.

Another known technique does not use a master unit which generates synchronizing signals. Instead, each reader is required to "listen" for potentially interfering signals and to initiate the interrogation/response cycle only at times when no interfering signals are detected. A disadvantage of this technique is that the timing at which each reader transmits interrogation signals is not deterministic and can be indefinitely delayed, resulting in a reduced number of interrogation cycles per unit time and deterioration of the system's performance in terms of detecting and tracking transponders.

It could also be contemplated, in a system which uses a master unit, to provide a back-up unit which monitors operation of the master unit and which, upon detecting a failure of the master unit, takes over as master. (This approach has been used in disk drive units in which it is desired to synchronize the respective phases of rotation of plural disk drives included in a unit.) However, even in this case, failure of both the master and the back-up unit would incapacitate the system or a significant part of the system.

OBJECTS AND SUMMARY OF THE INVENTION

It is accordingly an object of the invention to provide a method and apparatus for synchronizing operations of a plurality of electronic devices.

It is a further object of the invention to provide a method and apparatus for synchronizing the initiation of interrogation response cycles by a plurality of reader devices in an asset tracking and control system.

According to an aspect of the invention, there is provided a method of synchronizing a plurality of electronic devices including a master unit and a plurality of other units, with the method including the steps of transmitting a synchronizing signal at predetermined intervals from the master unit to at least one of the other units, and, in each of at least two of the other units, detecting whether a synchronizing signal is received by each of the at least two other units within a respective predetermined period of time and changing a mode of operation of the respective other unit if a synchronizing signal is not received by the respective other unit within the respective predetermined period of time.

Further in accordance with this aspect of the invention, if a synchronizing signal is not received by the respective other unit within the respective predetermined period of time, the mode of operation of the respective other unit may be changed from a first mode of operation in which the respective other unit transmits a synchronizing signal only in response to receiving a synchronizing signal to a second mode of operation in which the respective other unit transmits a synchronizing signal at predetermined intervals without receiving a synchronizing signal. Alternatively, if a synchronizing signal is not transmitted to the respective other unit within the respective predetermined period of time, the mode of operation of the respective other unit may be changed from a first mode of operation in which the respective other unit does not transmit any synchronizing signal to a second mode of operation in which the respective other unit transmits a synchronizing signal at predetermined intervals.

According to another aspect of the invention, there is provided a synchronized network of electronic devices, including a plurality of electronic devices and means for interconnecting the devices for transmission of synchronizing signals among the devices, with the plurality of electronic devices including (a) a master unit for transmitting a synchronizing signal at predetermined intervals to at least one other of the electronic devices and (b) at least two back-up units each for detecting whether a synchronizing signal is received by the back-up unit within a respective predetermined period of time and for transmitting a synchronizing signal at predetermined intervals if a synchronizing signal is not received by the respective back-up unit within the respective predetermined period of time.

According to the latter aspect of the invention, the means for interconnecting may include means for interconnecting the devices in daisy-chain fashion, with each device other than the master unit transmitting a synchronizing signal to a next one of the devices in response to receiving a synchronizing signal from a previous one of the devices. Each of the devices may include a first port for receiving synchronizing signals, a second port for transmitting synchronizing signals, and relay means for selectively providing a short-circuit connection between the first and second ports.

Alternatively, the means for interconnecting may include a bus line for connecting all of the devices in common, with the respective predetermined period of time for each back-up unit being different in duration from the respective predetermined period of time for each of the other back-up units.

According to a preferred embodiment of the network of devices, each of the devices includes means for transmitting an electronic article surveillance interrogation signal, and each device other than the master unit transmits the interrogation signal in response to receiving a synchronizing signal.

According to a further aspect of the invention, there is provided a synchronized network of electronic devices including a master device which includes means for generating synchronizing signals at regular intervals and an output terminal for outputting the synchronizing signals, a second device including an input terminal connected to the output terminal of the master device, means for generating a synchronizing signal in response to receipt of the synchronizing signal at the input terminal, and an output terminal for outputting the synchronizing signal generated by the means for generating of the second device, and a third device which includes an input terminal connected to an output terminal of the second device, means for generating a synchronizing signal in response to receipt of a synchronizing signal at the input terminal of the third device and an output terminal for outputting the synchronizing signal generated by the means for generating of the third device. In addition, the second device includes means for determining whether a synchronizing signal is received at the input terminal of the second device during a predetermined period of time and for generating synchronizing signals at regular intervals if it is determined that no synchronizing signal is received at the input terminal of the second device during the predetermined period of time. The synchronized network of electronic devices may further include a fourth device having an input terminal connected to an output terminal of the third device, with the third device including means for determining whether a synchronizing signal was received at the input terminal of the third device during a respective predetermined period of time and for generating synchronizing signals at regular intervals if it is determined that no synchronizing signal is received at the input terminal of the third device during the respective predetermined period of time. The second, third, and fourth devices may all be substantially identical to each other and may be electronic article surveillance readers which include means for generating a signal for interrogating an electronic article surveillance marker in response to receipt of a synchronizing signal at the input terminal of the respective device. The master device may also be an electronic article surveillance reader which includes means for generating signals for interrogating an electronic article surveillance marker at regular intervals in synchronism with the synchronizing signals generated by the master device.

According to yet another aspect of the invention, there is provided a device for reading an electronic article surveillance marker, including receive means for receiving a synchronizing signal, means for generating, in response to receipt of the synchronizing signal by the receive means, an interrogation signal for interrogating the marker, control means for determining whether a synchronizing signal is received by the receive means during a predetermined period of time, and sync means, responsive to the control means, for generating periodic synchronizing signals at regular intervals, and for generating interrogation signals at regular intervals in synchronism with the periodic synchronizing signals generated at regular intervals, if it is determined by the control means that no synchronizing signal is received by the receive means during the predetermined period of time.

According to still a further aspect of the invention, there is provided a device for reading an electronic article surveillance marker, including receive means for receiving synchronization signals, interrogation means for generating interrogation signals for interrogating the marker, and sync means for generating synchronization signals, with the device being selectively operated in a first mode of operation in which the interrogation means and the sync means are responsive to the receive means for respectively generating an interrogation signal and a synchronization signal upon receipt of the synchronizing signal by the receive means and a second mode of operation in which the interrogation means and the sync means respectively generate interrogation signals and synchronization signals at regular intervals in synchronism with each other during periods in which the receive means receives no synchronization signals, the device further including control means, operatively associated with the receive means, the interrogation means and the sync means for switching the device between the first and second modes of operation.

According to still another aspect of the invention, there is provided a synchronized network of electronic devices, including a synchronizing signal bus connection; a master device including circuitry for generating synchronizing signals at regular intervals, a first output terminal connected to the synchronizing signal bus connection for transmitting the synchronizing signals onto the bus connection, and a second output terminal for outputting the synchronizing signals; a back-up device including circuitry for selectively generating synchronizing signals at regular intervals, an output terminal connected to the synchronizing signal bus connection for transmitting onto the bus connection the synchronizing signals selectively generated in the back-up device, and an input terminal connected to the second output terminal of the master device for receiving the synchronizing signals outputted from the second output terminal; and a plurality of slave devices connected to the synchronizing signal bus connection for receiving the synchronizing signals transmitted from the first output terminal of the master device and for operating in synchronism with the synchronizing signals received by the slave devices. Further in accordance with the latter aspect of the invention, the back-up device may also include a second output terminal for outputting synchronizing signals generated in the back-up device and the network may also include an additional device which includes circuitry for selectively generating synchronizing signals at regular intervals, an output terminal connected to the synchronizing signal bus connection for transmitting onto the bus connection the synchronizing signals selectively generated in the additional device, and an input terminal connected to the second output terminal of the back-up device for receiving the synchronizing signals generated in the back-up device. Also in accordance with the latter aspect of the invention, each of the slave devices may be an electronic article surveillance reader which includes circuitry for generating a signal for interrogating an electronic article surveillance marker in response to receipt of a synchronizing signal, and each of the master device and the back-up device may be an electronic article surveillance reader.

Still further in accordance with the latter aspect of the invention, the back-up device may include circuitry for determining whether a synchronizing signal is received at the input terminal of the back-up device during a predetermined period of time, with the back-up device being arranged to enter into a mode of operation in which the back-up device generates synchronizing signals at regular intervals and transmits those signals onto the synchronizing signal bus connection, if it is determined that no synchronizing signal is received at the input terminal of the back-up device during the predetermined period of time.

The foregoing and other objects and features of the invention will be further understood from the following detailed description of preferred embodiments and practices thereof and from the drawings, wherein like reference numerals identify like components and parts throughout.

DESCRIPTION OF PREFERRED EMBODIMENTS

Figure 1:
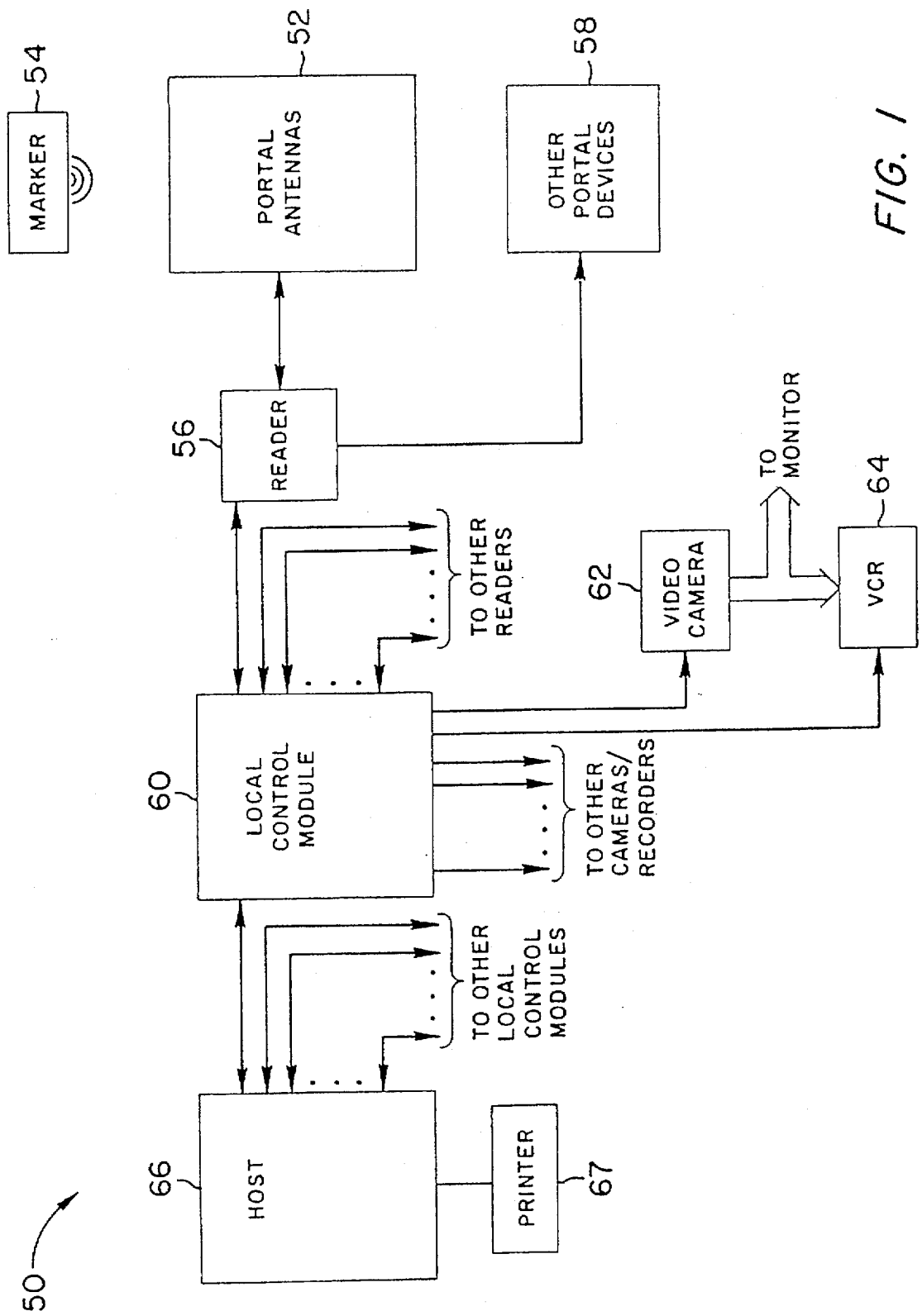
FIG. 1 is a system block diagram of an asset control and tracking system in which the present invention may be applied.

Further aspects of the reader 56 discussed in connection with FIG. 1 will now be described, with reference to FIGS. 3 and 4.

Figure 3:
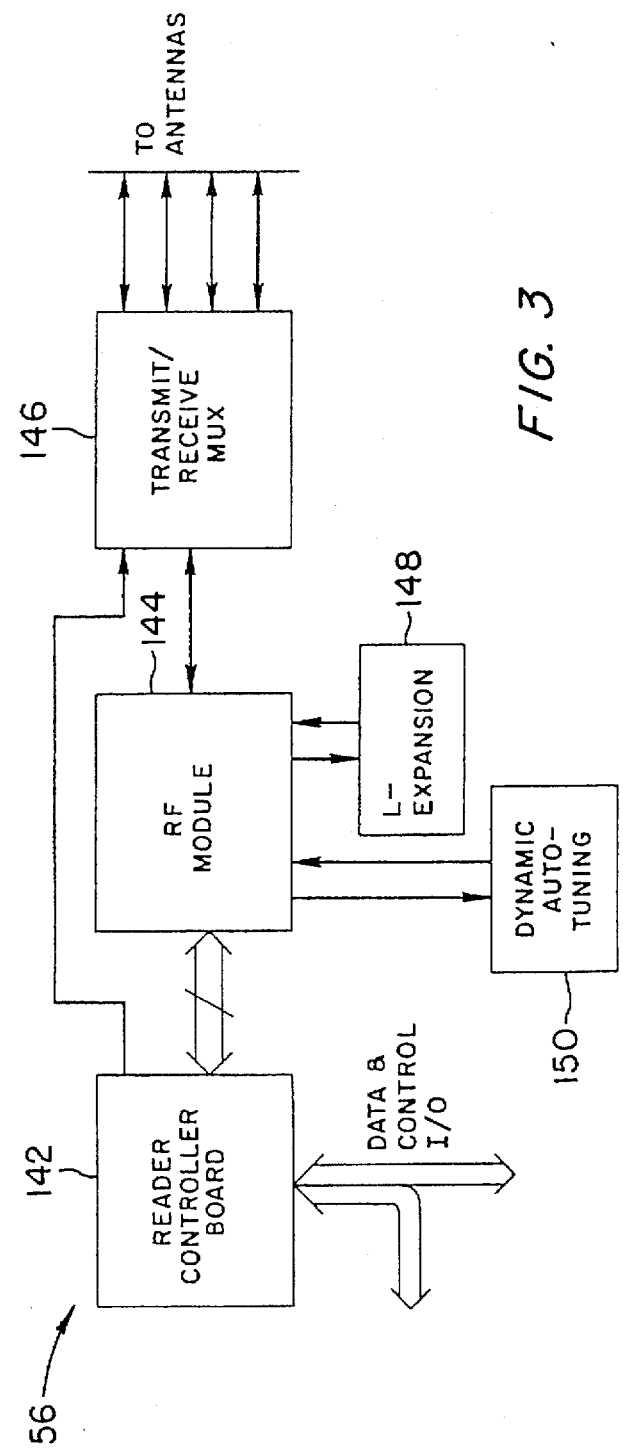
FIG. 3 is a block diagram of a reader device employed in the system of FIG. 1 for reading transponder signals.

Referring initially to FIG. 3, the major components of the reader 56 are a controller board 142, a radio frequency module 144, a transmit/receive multiplex board 146, an L-expansion board 148 and a dynamic auto-tuning module 150.

The controller board 142 exchanges data with the local control module 60 (FIG. 1) to which the reader 56 is connected, and also may provide command signals for other portal devices 58 (FIG. 1) and/or may exchange data with the other portal devices.

The reader controller board 142 also controls the RF module 144 and the transmit/receipt multiplexer board 146 for the purpose of controlling the transmission of interrogation signals from, or receipt of transponder signals through, portal antenna 52. The L-expansion board 148 associated with RF module 144 is provided to accommodate the reader 56 to variations in length of the cable connecting the reader 56 to the antenna 52. The dynamic auto tuning module 150 is also provided in association with RF module 144, for the purpose of maintaining the portal antennas in a correct tuning condition.

Figure 4:
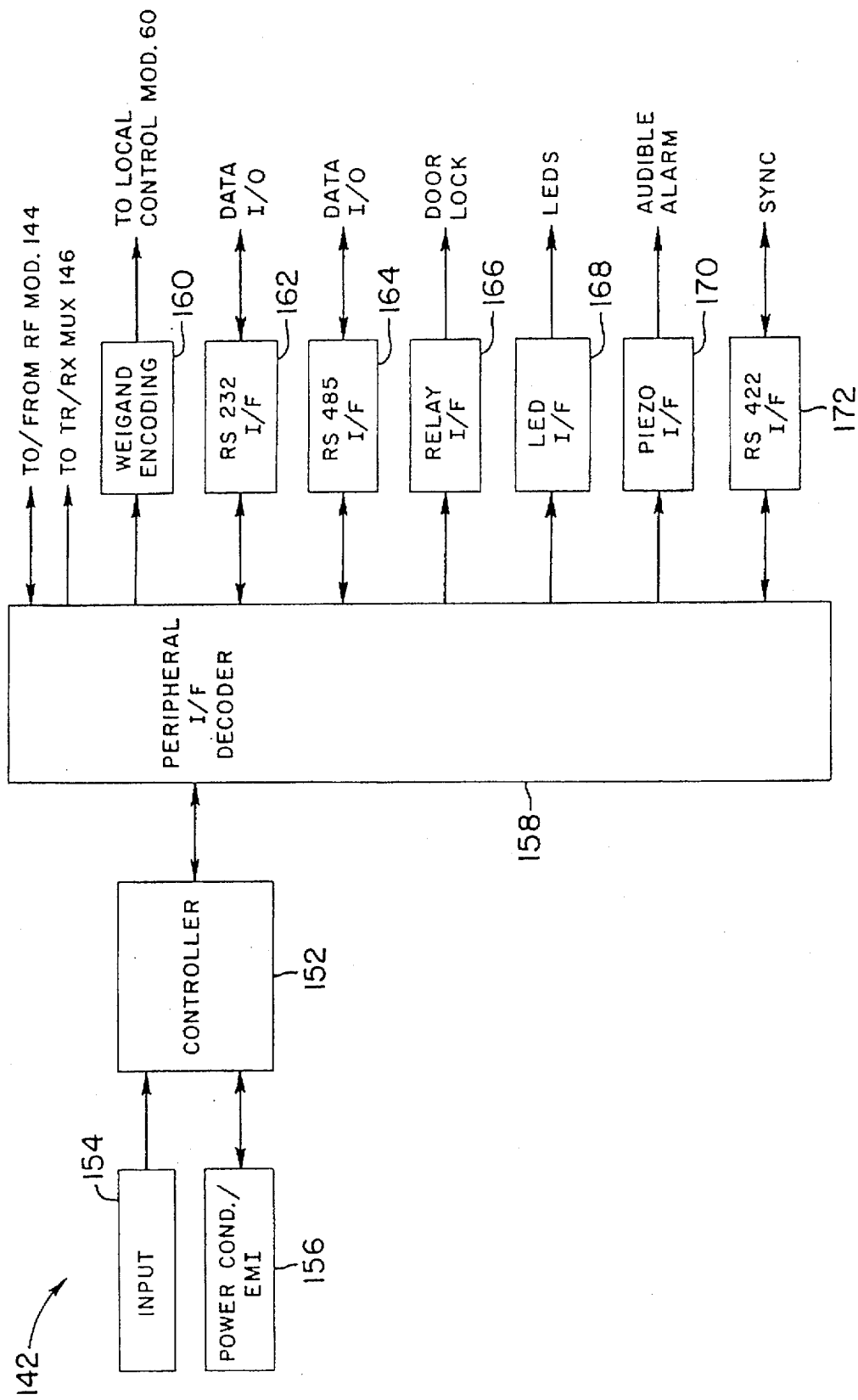
FIG. 4 is a block diagram of a main controller board that constitutes a portion of the reader of FIG. 3.

Some details of the reader controller board 142 are shown in FIG. 4. The controller board 142 includes a controller 152, which may be constituted by a conventional control circuit such as the model 80C320 microcontroller available from Dallas Semiconductor Corp., Dallas, Texas. An input device 154 is connected to the controller 152 for the purpose of providing various control and calibration setting signals. Also associated with the controller 152 is conventional power conditioning and electromagnetic interference suppression circuitry 156. An interface decoder 158 is provided to route data and control signals between the microcontroller 152 and various input/output and peripheral devices, including a Weigand encoding unit 160, an RS232 interface 162, an RS485 interface 164, a relay driver and interface 166, an LED driver and interface 168 and a piezo driver and interface 170. The nature of the signals provided or received through these units is described in more detail in the abovereferenced application Ser. No. 08/437,313 pending.

Also connected to the controller 152 by way of the peripheral decoder 158 is an RS422 interface 172. The RS422 interface 172 is provided for receipt and/or transmission of synchronizing signals used to synchronize operation of the reader 56 and other readers in the asset tracking system 50, in accordance with techniques to be described below.

Figure 5:
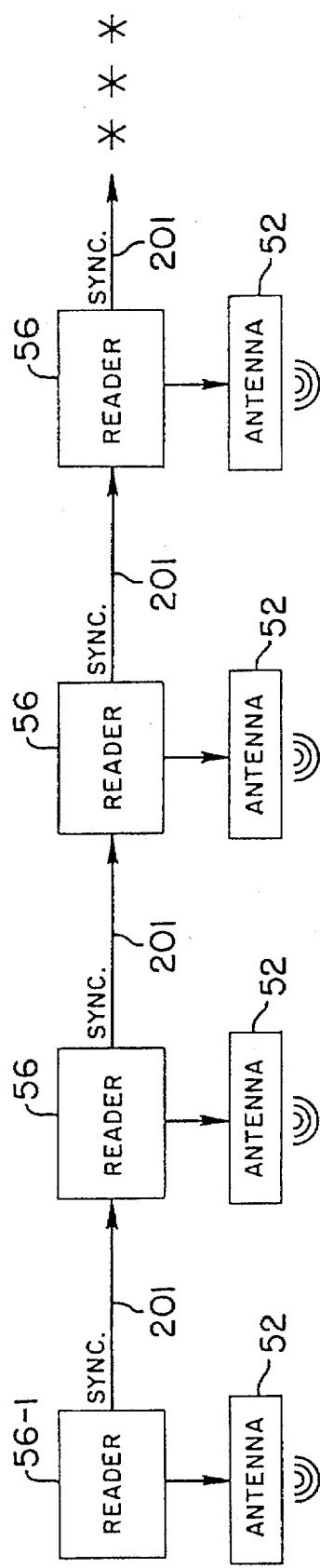
FIG. 5 illustrates a daisy-chain synchronizing signal network, provided in accordance with the present invention for interconnecting reader devices employed in the system of FIG. 1.

A daisy-chain arrangement for interconnecting some or all of the readers included in the asset tracking system is shown in FIG. 5. If fewer than all of the readers are interconnected together, it is to be understood that, at least, each group of neighboring readers is interconnected. As shown in FIG. 5, a reader 56-1 is at the head of the chain of readers, with other readers 56 provided downstream from the reader 56-1. A signal path connection 201 is provided from the reader 56-1 to the next reader in the chain, and from each reader downstream from the reader 56-1 to a following reader in the chain. The signal connection 201 may be provided in the form of an 18 gauge twisted-pair wire, for example. In the case of each reader, it will be understood that the sync signal connection is made through the respective reader's RS422 interface and an associated port or ports.

Respective antennas 52 controlled by each reader 56 are also shown in FIG. 5. The number of readers 52 daisy-chained together may, of course, exceed the four readers explicitly shown in FIG. 5.

Figure 7:
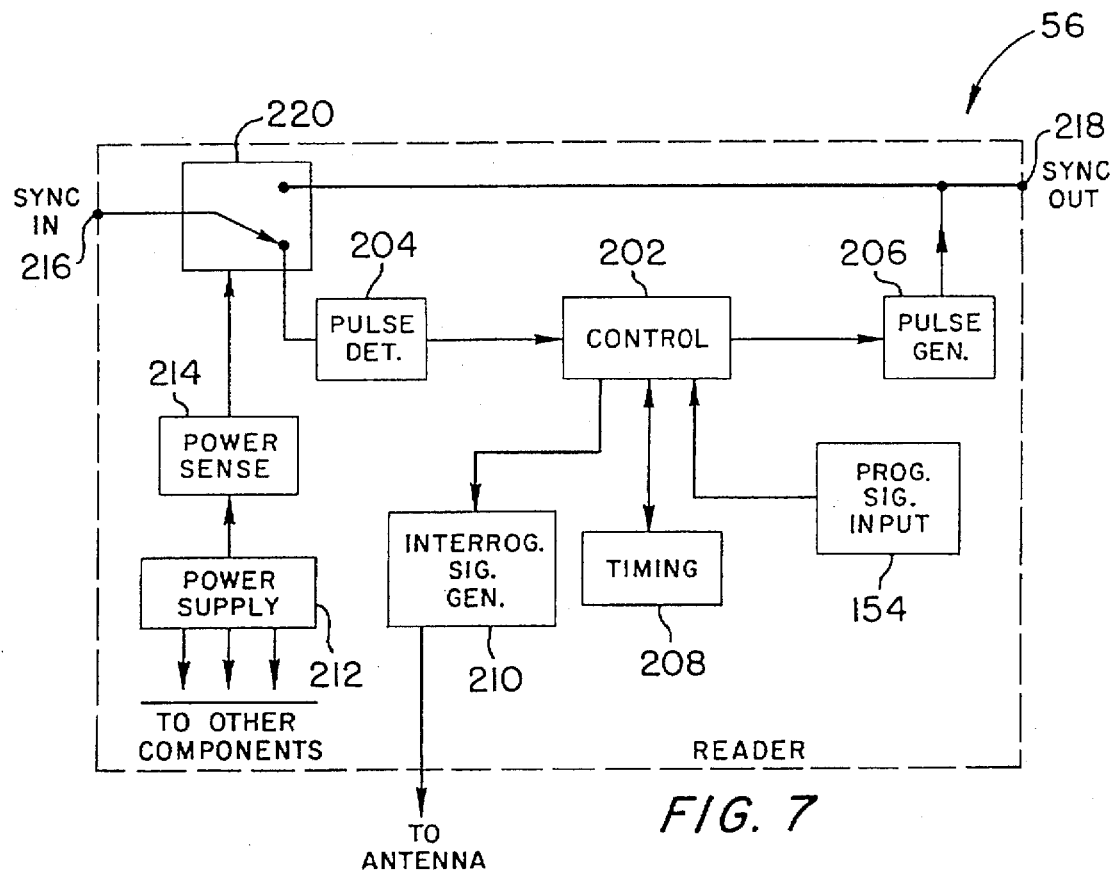
FIG. 7 is a simplified block diagram of a reader device adapted for use with the daisy-chain sync signal network of FIG. 5.

FIG. 7 illustrates, in a somewhat schematic and simplified form, an embodiment of a reader 56 adapted for use in the daisy-chain arrangement shown in FIG. 5.

The reader 56 as shown in FIG. 7 includes a control function 202, a sync pulse detection function 204, a sync pulse generating function 206, a timing function 208 and an interrogation signal generating function 210. The functions 202, 204, 206 and 208 may be constituted, at least in part, by the controller 152 (FIG. 4).

Programming signals are provided for the control function 202 by means of the previously mentioned input device 154 (FIG. 4), which is also shown in FIG. 7.

A power supply 212 (which may be constituted, at least in part, by the power conditioning and EMI circuit 156) is also provided in the reader 56 as a source of power for the components making up the reader 56. A power sense function 214 is associated with the power supply 212 for the purpose of detecting failure of the power supply 212. The power sense function 214 may be constituted, in part, by the controller 152.

The reader 56 also has an input port 216 for receiving synchronizing signals and an output port 218 for transmitting synchronizing signals generated in the reader 56. A relay circuit 220 is connected between the input port 216 and the output port 218. The relay circuit 220 is normally maintained in the position shown in FIG. 7 so that synchronizing signals received at the input port 216 are provided for detection by the pulse detecting function 204. However, when a power failure is detected through the power sensing function 214, the relay circuit 220 is switched to a position in which the input port 216 is directly connected to the output port 218. In this way, a failure of the power supply for the reader 56 will not "break the chain" of the sync signal network depicted in FIG. 5. The ports 216 and 218, relay circuit 220 and a portion of the pulse detection and generation functions, may be constituted by the RS422 interface 172 shown in FIG. 4.

Operation of the reader 56 shown in FIG. 7 will now be described with reference to the flow diagram of FIG. 9.

After power is supplied to the reader (step 250), an initialization routine is carried out (step 252).

Following step 252 is step 258. At step 258, a predetermined time-out interval is initiated. For example, the time-out interval may be twice as long as the duration of interrogation signal cycle shown in FIG. 2 (that is, twice as long as the time interval from time T1 to time T4.) Following step 258 is step 260, at which it is determined whether a synchronizing signal is received at the input port 216 of the reader prior to expiration of the time-out period.

It will initially be assumed that the reader in question is not at the head of the daisy-chain and that another reader upstream from the reader in question is functioning properly as a master unit. In this case, a sync signal will be received prior to time-out, so that the reader in question functions as a slave unit, and step 262 follows step 260. At step 262, the reader generates a synchronizing signal in response to the synchronizing signal received at the input port 216 and transmits from the output port 218 the synchronizing signal generated by the reader. Also in response to the synchronizing signal received by the reader, and in synchronism with the generation of the synchronizing signal to be transmitted through the output port 218, the reader generates an interrogation signal. Accordingly, it will be recognized that the timing at which interrogation signals are generated by the reader is controlled by the timing at which synchronizing signals are received at the input port 216, when the reader is functioning as a slave unit.

Figure 9:
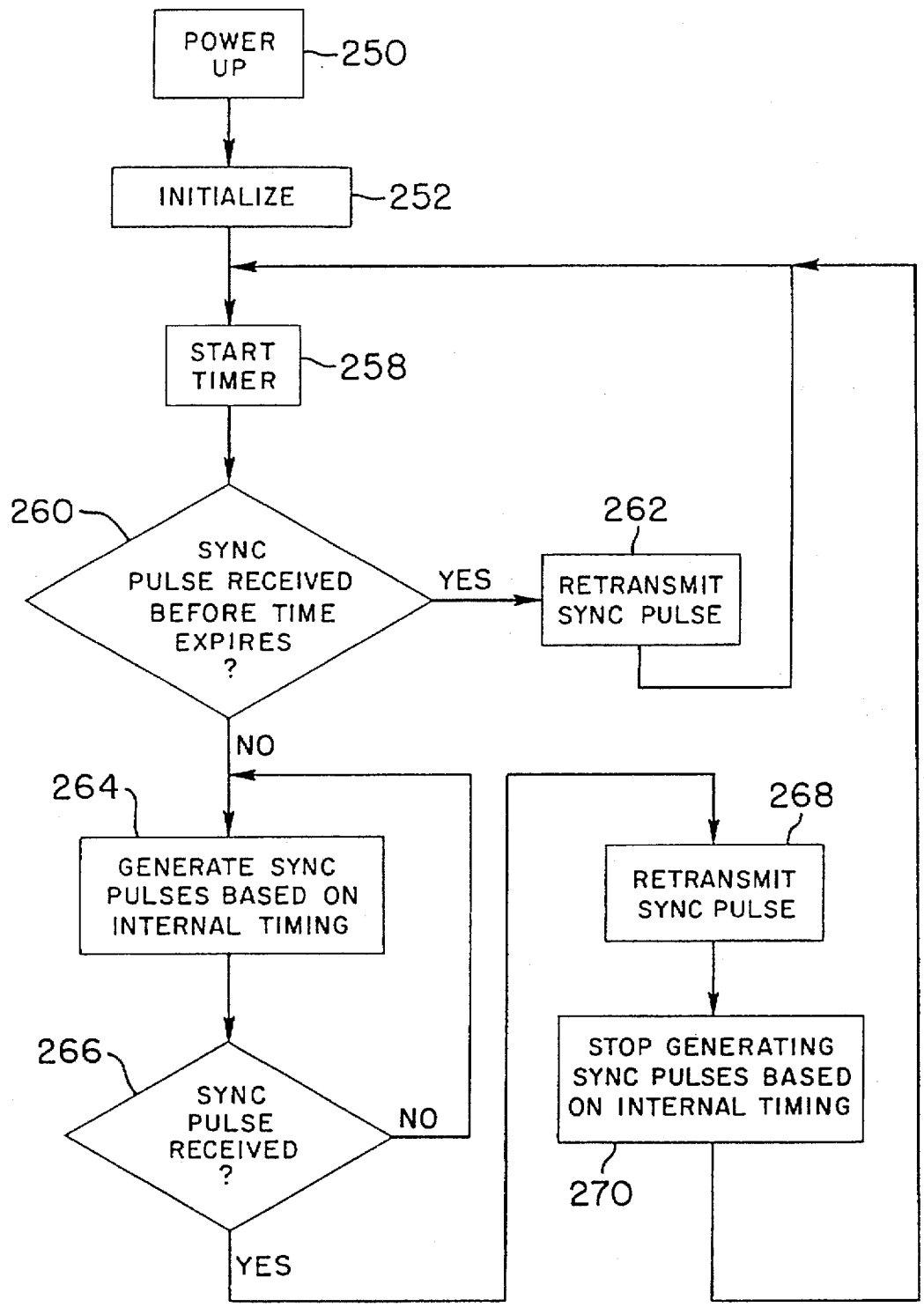
FIG. 9 is a flow chart which illustrates operation of the reader device of FIG. 7.

Following step 262, the procedure of FIG. 9 loops back to step 258, at which the time-out period is again initiated.

Assuming that synchronizing signals are received at the desired regular intervals, the procedure of FIG. 9 will simply loop through steps 258, 260 and 262 repeatedly, generating interrogation signals and synchronizing signals for re-transmission down the daisy-chain at regular intervals in synchronism with received synchronizing signals.

Figure 2:
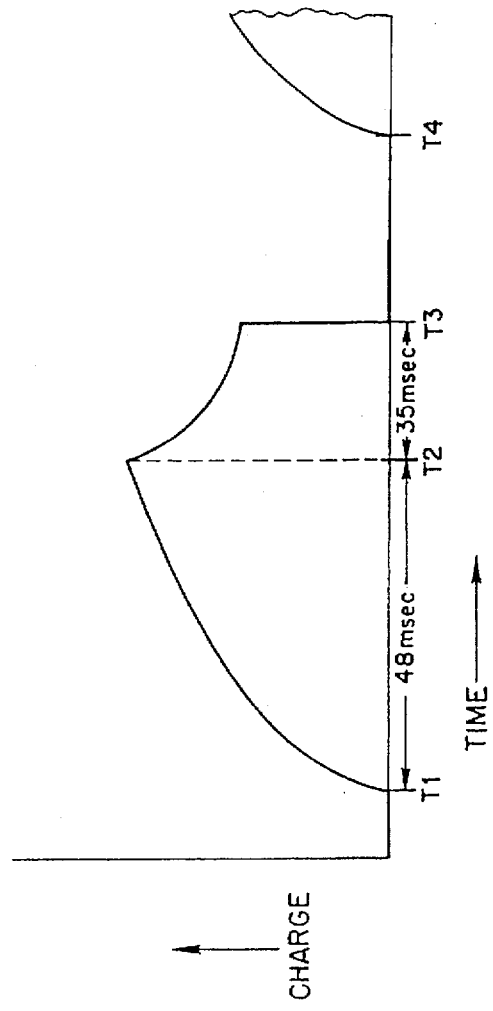
FIG. 2 is a waveform diagram which illustrates an interrogation and response cycle used in connection with a transponder employed in the system of FIG. 1.

The reader 56 is arranged so that detection of the received synchronizing signal and generation and re-transmission of a synchronizing signal in response to the received synchronizing signal are performed quite rapidly and signal propagation delay down the daisy-chain is minimal in comparison with the duration of the desired interrogation signal cycle (FIG. 2).

Now, contrary to the previous assumption, it will be assumed that the reader in question either is located at the head of the daisy-chain or, for some other reason (such as failure of an upstream reader which had been acting as the master unit), a sync signal is not received within the predetermined time-out period. In either case, step 264 follows step 260, causing the reader in question to act as a master unit. Specifically, in step 264, the reader generates synchronizing signals, and also interrogation signals in synchronism with the synchronizing signals, based on the reader's internal timing function and in accordance with the timing cycle illustrated in FIG. 2. However, in addition, the reader continues to "listen"0 for synchronizing signals received at the input port 216 (step 266). As long as no synchronizing signal is received at the input port 216, the reader continues to generate synchronizing signals and interrogation signals based on its own timing, thereby functioning either as a master unit for the entire daisy-chain or a back-up master unit for the portion of the daisy-chain downstream from the reader. But if a sync signal is received at the input port 216, then step 268 follows step 266. At step 268, in a similar manner to step 262, the reader responds to the received synchronizing signal by generating internally a synchronizing signal to be transmitted via the output port 218, and the reader 56 also generates an interrogation signal. In addition, the reader stops generating synchronizing signals and interrogation signals based on its internal timing (step 270), and the procedure loops back to step 258, thereby returning the reader to the loop consisting of steps 258, 260 and 262, in which the reader functions as a slave unit.

According to a preferred embodiment of the invention, each of the readers shown in FIG. 5 is like the reader shown in FIG. 7 and operates according to the flow-diagram of FIG. 9, with the reader 56-1 at the head of the daisy-chain network acting as a master unit and the other readers functioning as slave units. Each reader other than the master unit receives a sync signal, and, in response to receiving the sync signal, generates a sync signal to be propagated down the daisy-chain. Also, each reader other than the master responds to receiving a sync signal by generating an interrogation signal. In this way, the sync signals propagating through the daisy-chain (with minimal delay, as noted before) cause all of the daisy-chained readers to operate with synchronized interrogation signal cycles, thereby preventing each antenna from interfering with the transponder signal receiving portion of the interrogation signal cycle of neighboring antennas.

It is within the contemplation of the invention that every reader included in the asset tracking system be connected to the same daisy-chain. Alternatively, two or more daisy-chains may be provided, configured so that any pair of antennas that are close enough to each other to interfere with each other are connected via the same daisy-chain.

In the event that the reader acting as the master unit fails, the next unit in the chain will detect the absence of synchronizing signals at its input port, and will take over as a back-up master unit, in accordance with step 264 of FIG. 9. If the reader acting as the back-up master unit fails, then the next reader in the chain similarly will take over the function of master unit. Also, as previously noted, if a slave unit fails, the slave unit is arranged to provide a direct connection between its input and output ports so that only the failed slave unit, but not the balance of the chain, is put out of service. It will be recognized that the number of back-up units that can be provided according to the arrangement of FIG. 5 is, as a practical matter, limited only by the total number of reader units that are daisy-chained together. Thus a large degree of redundancy is provided, and the asset tracking system will continue to operate satisfactorily even if a master unit and one or more back-up units fail.

Although it is possible for there to be contention among two or more slave units in attempting to take over as back-up master unit upon failure of a master unit, such contention will quickly be resolved in favor of the unit immediately downstream from the master within one or two interrogation signal cycles. The resolution of the contention results from the operation of steps 266, 268 and 270 in the units downstream from the slave unit that is closest to the master.

The daisy-chain arrangement shown in FIG. 5 is a preferred embodiment of the invention because of the relatively low signal current levels that are needed for the transmitted and retransmitted sync signals, and also because of the automatic prioritization of back-up units mentioned in the preceding paragraph. Nevertheless, it is also contemplated to provide multiple back-ups for a master unit in a common-bus-configured arrangement, as illustrated, for example, in FIG. 6A. In particular, the arrangement of FIG. 6A includes a common sync bus 300 to which are attached a number of readers 56M (including a unit designated 56M-1) which are capable of acting as master units, and a further group of readers 56S, which function as slave units that generate interrogation signals in response to sync signals transmitted via the sync bus 300 to the slave units from the one of the readers 56M which is acting as master.

It will be noted that each slave unit 56S is connected to the sync bus 300 so as to receive sync signals present on the sync bus. In addition, each reader 56M is connected to the sync bus 300 so as to be capable of applying a sync signal to the sync bus, but only the unit acting as the master unit actually applies sync signals to the sync bus.

It will be observed that the readers 56M are connected in a daisy-chain arrangement by connections 301, with reader 56M-1 at the head of the chain and followed by two back-up units. It is contemplated that fewer or more than two back-up units may be daisy-chained to the reader 56M-1. It is also contemplated to connect to the sync bus 300 more or fewer than the three slave units 56S explicitly shown in FIG. 6A and to connect slave units to any point on the sync bus 300. The master and back-up units may also be connected at any point on the sync bus, although daisy-chaining of the master and back-up units can be more easily accomplished if the master and back-up units are located near to each other.

Figure 8C:
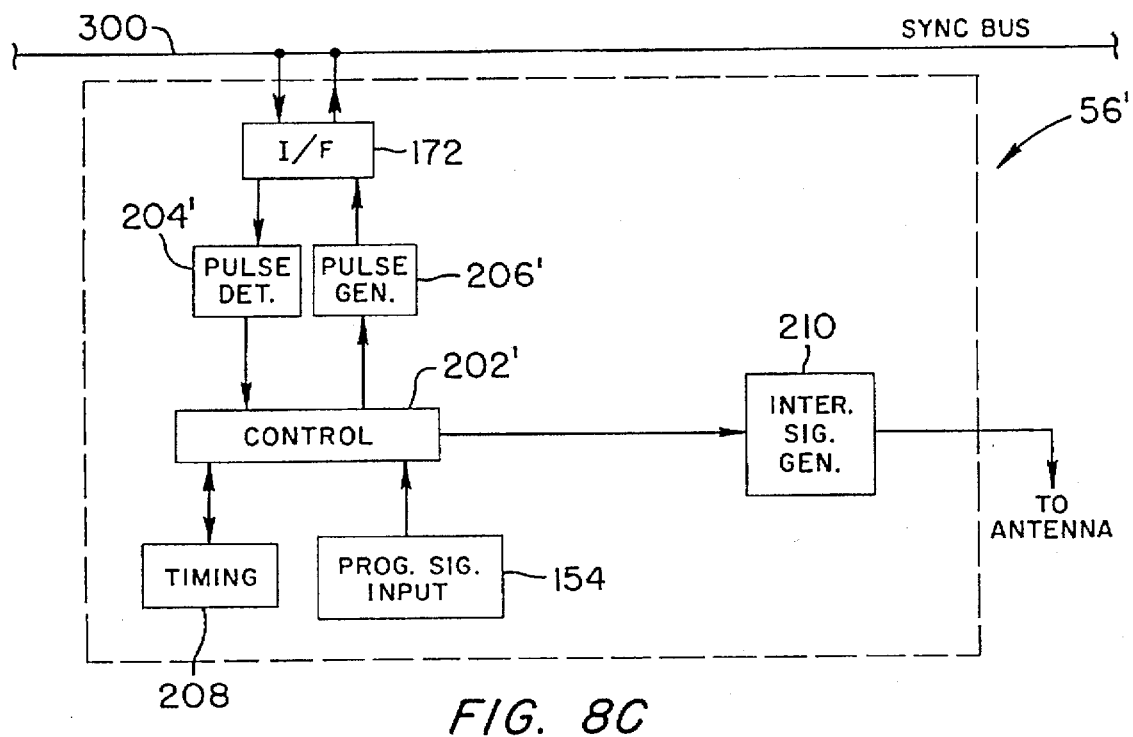
FIG. 8C is a simplified block diagram of a reader device adapted for use with the sync signal bus arrangement shown in FIG. 6B.
Figure 8A:
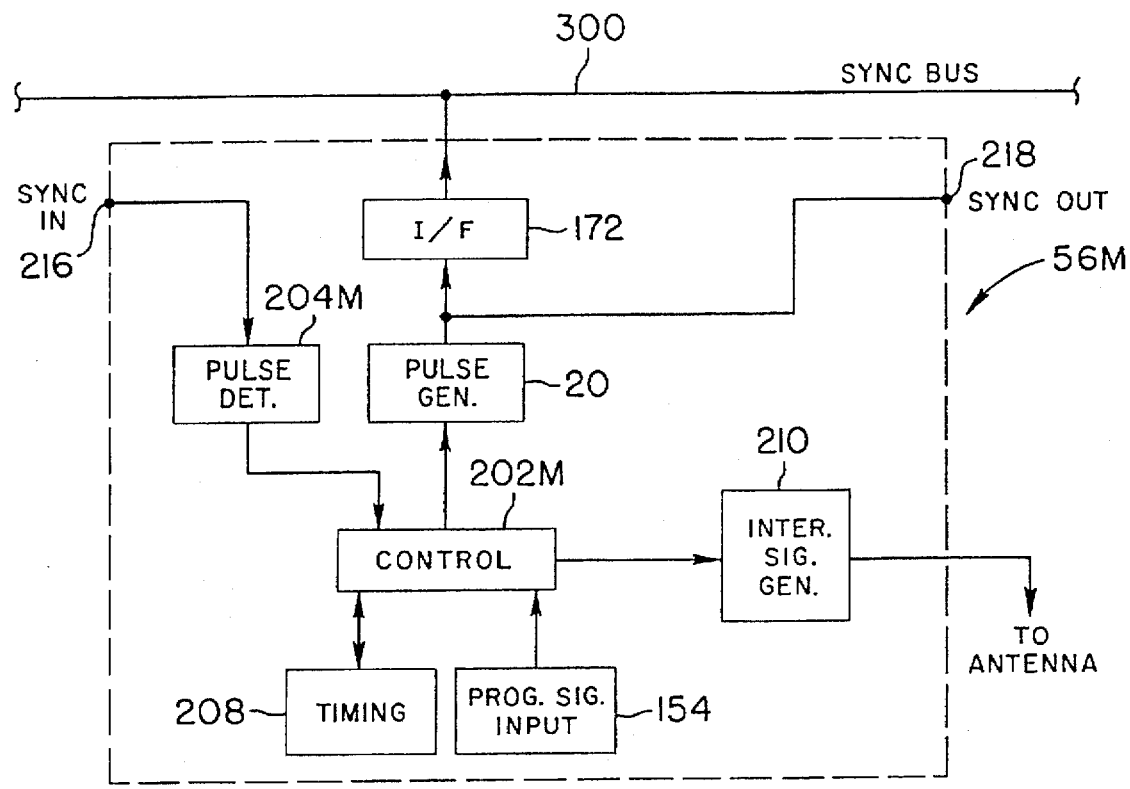
FIG. 8A is a simplified block diagram of a reader device adapted for use as a master unit in the hybrid bus/daisy-chain arrangement of FIG. 6A.
Figure 8B:
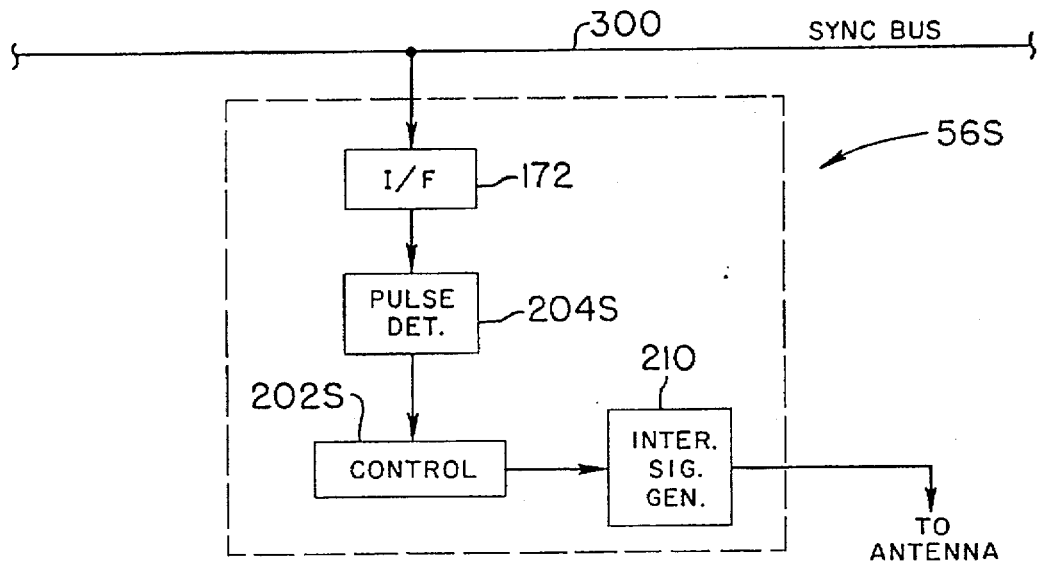
FIG. 8B is a simplified block diagram of a reader device adapted for use as a slave unit in the hybrid bus/daisy-chain arrangement of FIG. 6A.

As shown, respectively, in FIGS. 8A and 8B, the master and back-up units 56M and the slave units 56S are somewhat different from the readers 56 used in the daisy-chain arrangement of FIG. 5. In particular, in the unit 56M illustrated in FIG. 8A, a control function 202M is connected to receive sync signals via an input port 216 and a sync signal detection function 204M. In addition, each reader 56M has its control function 202M connected to the sync bus 300 via a sync signal generating circuit 206M and its RS422 interface 172, so that the reader can apply sync signals to the bus 300. The control function 202M is also able to transmit sync signals from an output port 218 through the sync signal generating function 206M. Also associated with the control function 202M are an internal timing function 208, an interrogation signal generating function 210 and a programming signal input device 154, all of which may be like the corresponding portions of the reader shown in FIG. 7.

The daisy-chain arrangement of the lead unit 56M-1 and the back-up units is implemented through the ports 216 and 218. Each unit 56M has its input port 216 connected to the output port 218 of the preceding unit and its output port 218 connected to the input port 216 of a following unit, except that the input port of the lead unit 56M-1 is not connected to any other unit, and therefore does not receive any sync signals, and the output port of the last (right-most) unit 56M is not connected to transmit a sync signal to the input port of any other unit 56M. Although not shown in FIG. 8A, each reader 56M may also include a mechanism (like switch 220 and power sense function 214 of FIG. 7) for selectively providing a direct connection between its input and output ports.

Figure 10A:
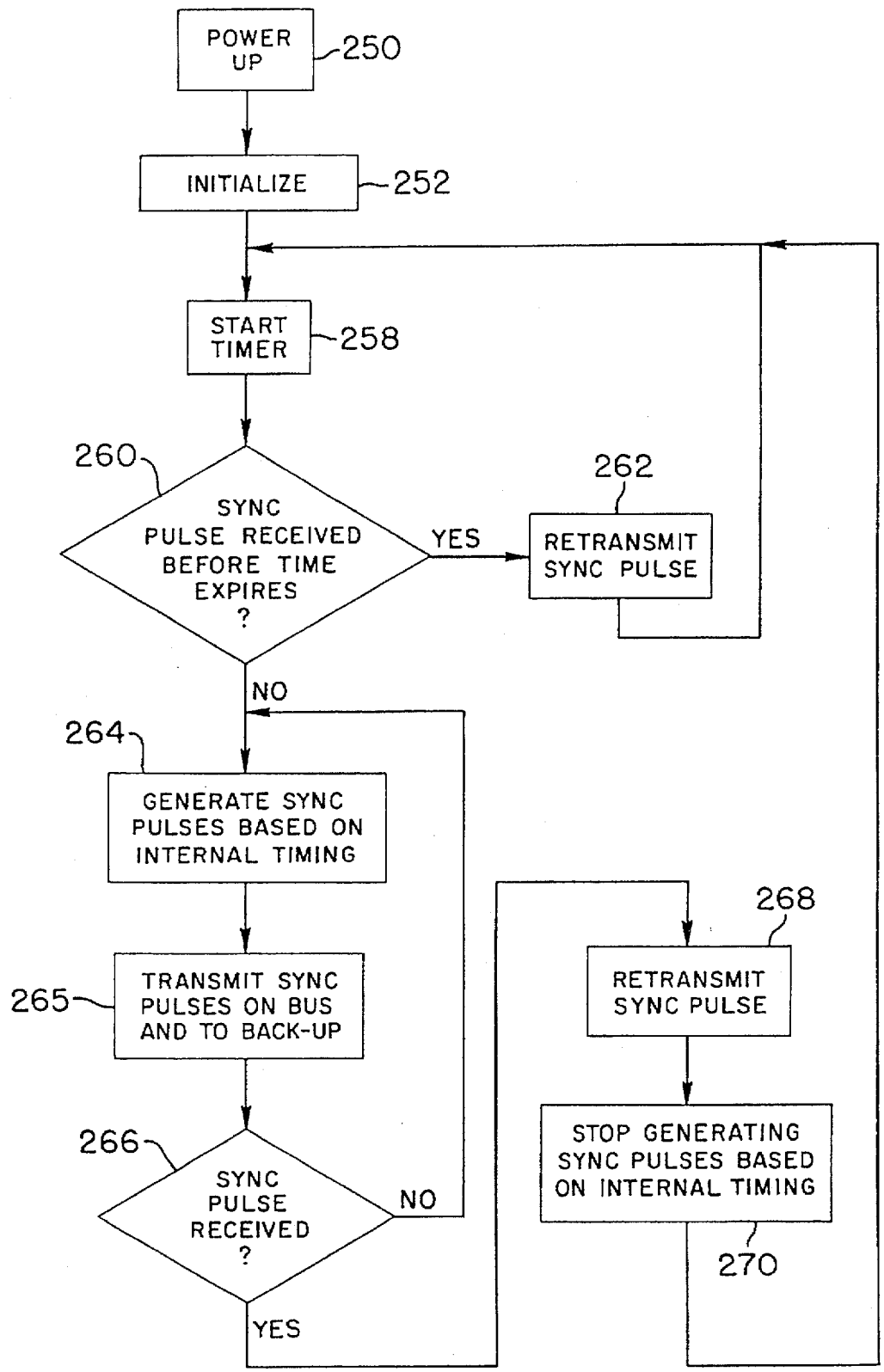
FIG. 10A is a flow chart which illustrates operation of the master reader device of FIG. 8A.

Operation of the daisy-chained readers 56M is illustrated in FIG. 10A and is similar to that of readers 56 (FIGS. 7 and 9). The operating procedure of FIG. 10A, because of its similarity to that of FIG. 9, need not be explained in detail except to note the inclusion in FIG. 10A of a step 265 between steps 264 and 266. The step 265 indicates that when a reader 56M is functioning as a master unit, it applies sync signals to the sync bus 300 while simultaneously transmitting sync signals via its output port 218 to the first back-up unit. (By contrast, in the daisy-chain arrangement, the lead unit only transmits sync signals from its output port.) Otherwise, the procedure of FIG. 10A is like that of FIG. 9, with the loop of steps 258–262 representing operation as a back-up unit, and the loop of steps 264–266 representing operation as a master unit. When operating as a master unit, the reader generates interrogation and sync signals based on internal timing, and transmits the sync signals both to all of the slave units, via the sync bus, and to the back-up unit immediately downstream via output port 218.

When operating as a back-up unit, the reader generates interrogation and sync signals only in response to sync signals received via its input port, and, in this mode, the reader only retransmits sync signals via its output port. That is, back-up units do not retransmit sync signals over the sync bus, unless operating as a master unit.

As in the procedure of FIG. 9, the mode in which a reader 56M operates is determined by the presence or absence of sync signals at its input port. If sync signals are received at regular intervals shorter than the time-out period, then the reader 56M stays in back-up mode. For the unit 56M-1 at the head of the chain, of course no sync signals are provided, so that unit 56M-1 automatically enters the master mode. The other units will remain in the back-up mode unless the master unit fails. Contention is resolved on the basis of position in the daisy-chain., as discussed in connection with FIG. 9.

Figure 10B:
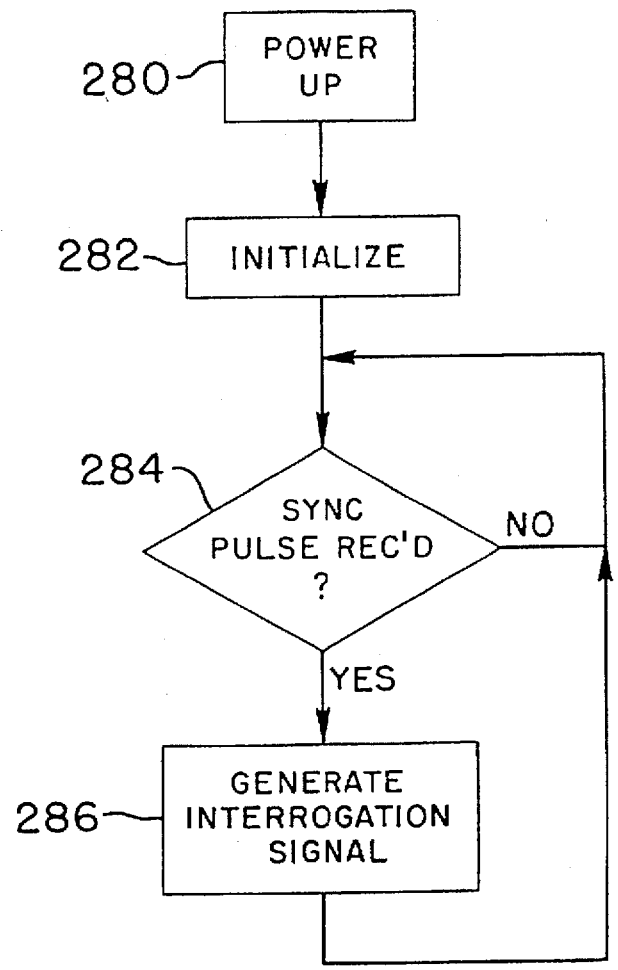
FIG. 10B is a flow chart which illustrates operation of the slave reader device of FIG. 8B.

The slave units 56S are illustrated in simplified functional form in FIG. 8B. Each unit 56S includes a control function 202S, connected to receive sync signals from the sync bus 300 via an interface 172 and a sync detection function 204S. An interrogation signal generating function 210 generates interrogation signals under the control of control function 202S. As shown in FIG. 10B, the slave reader 56S operates so that it generates interrogation signals only in response to synchronizing signals provided on the sync bus 300. In particular, the slave reader is powered up and initialized (steps 280 and 282 in FIG. 10B) and then waits to receive a synchronizing signal (step 284). Upon receiving a synchronizing signal, the slave reader generates an interrogation signal (step 286) and then again waits to receive a synchronizing signal. All of the slave readers operate in the same manner, and, accordingly, the operation of all readers 56S is synchronized through the sync bus, under control of the reader 56M which is acting as the master unit.

Figure 6B:
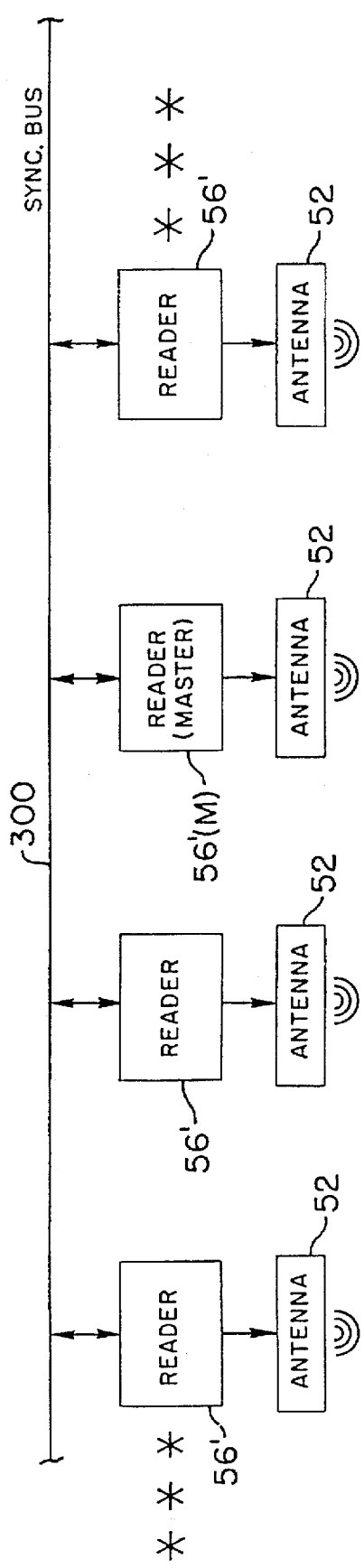
FIG. 6B illustrates another embodiment of a synchronizing signal bus arrangement provided for synchronizing reader devices in accordance with the invention.
Figure 6A:
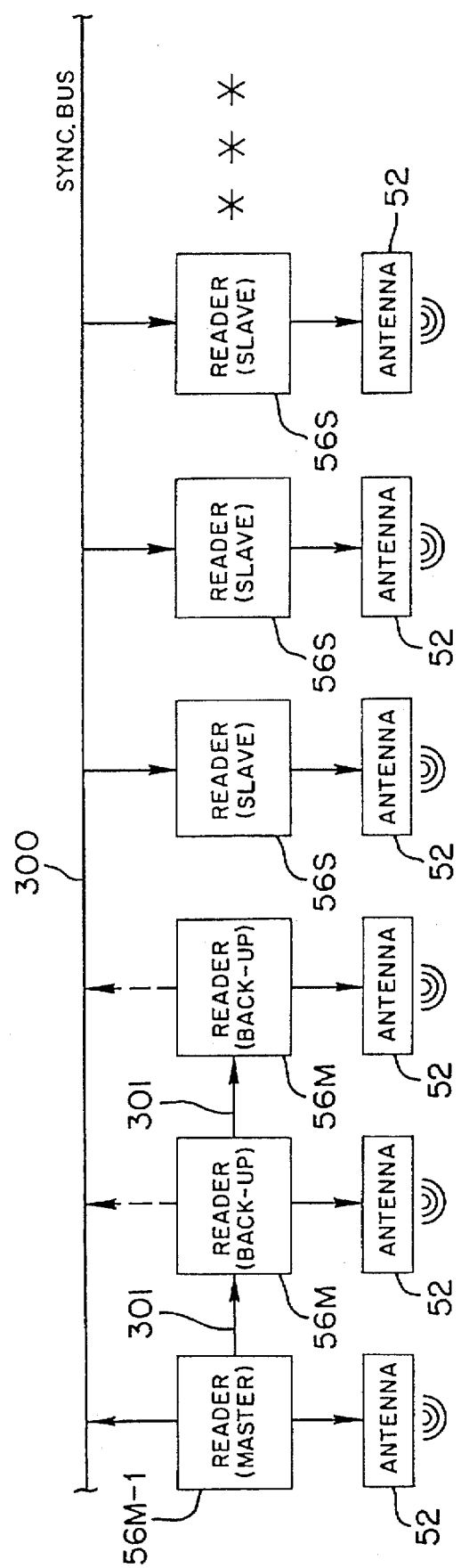
FIG. 6A illustrates a synchronizing signal bus arrangement, provided in accordance with another embodiment of the invention for synchronizing slave reader devices by means of a master unit daisy-chained with back-up units.

The synchronizing network arrangement of FIG. 6A may be considered a hybrid of a bus and a daisy-chain arrangement, since the slave units are controlled through the sync bus 300, and priority among the master units and back-up units is determined through a daisy-chain connection. It will be noted that the master and back-up units need not be readers, i.e., need not include interrogation signal generation and marker signal reading functions.

It is also contemplated in accordance with the invention to provide a "pure" bus arrangement having a master synchronizing unit and multiple back-up units. Such an arrangement is shown in FIG. 6B, which shows a sync bus 300 having attached thereto a plurality of readers 56', all of which are capable of acting as a master unit.

The number of readers attached to the bus 300 may, of course, be much larger than the four units explicitly shown in FIG. 6B. The reader 56'(M) designated as the master unit for controlling the synchronization of the other units may be located at essentially any point along the sync bus 300.

As is illustrated in FIG. 8C, the readers 56' differ in some respects from the readers used in the arrangements that were previously described. As shown in FIG. 8C, the reader 56' is connected to the bus 300 through an interface circuit (constituted by RS422 interface 172 shown in FIG. 4), and includes a control function 202', a sync signal detection function 204' and a sync signal generation function 206'. The functions 202', 204' and 206' are generally similar, respectively, to the functions 202, 204 and 206 of the reader 56 described in connection with FIG. 7. The reader 56' of FIG. 8C also includes a programming signal input device 154, an internal timing function 208 and an interrogation signal generating function 210, all of which may be essentially the same as the corresponding portions of reader 56.

Figure 10C:
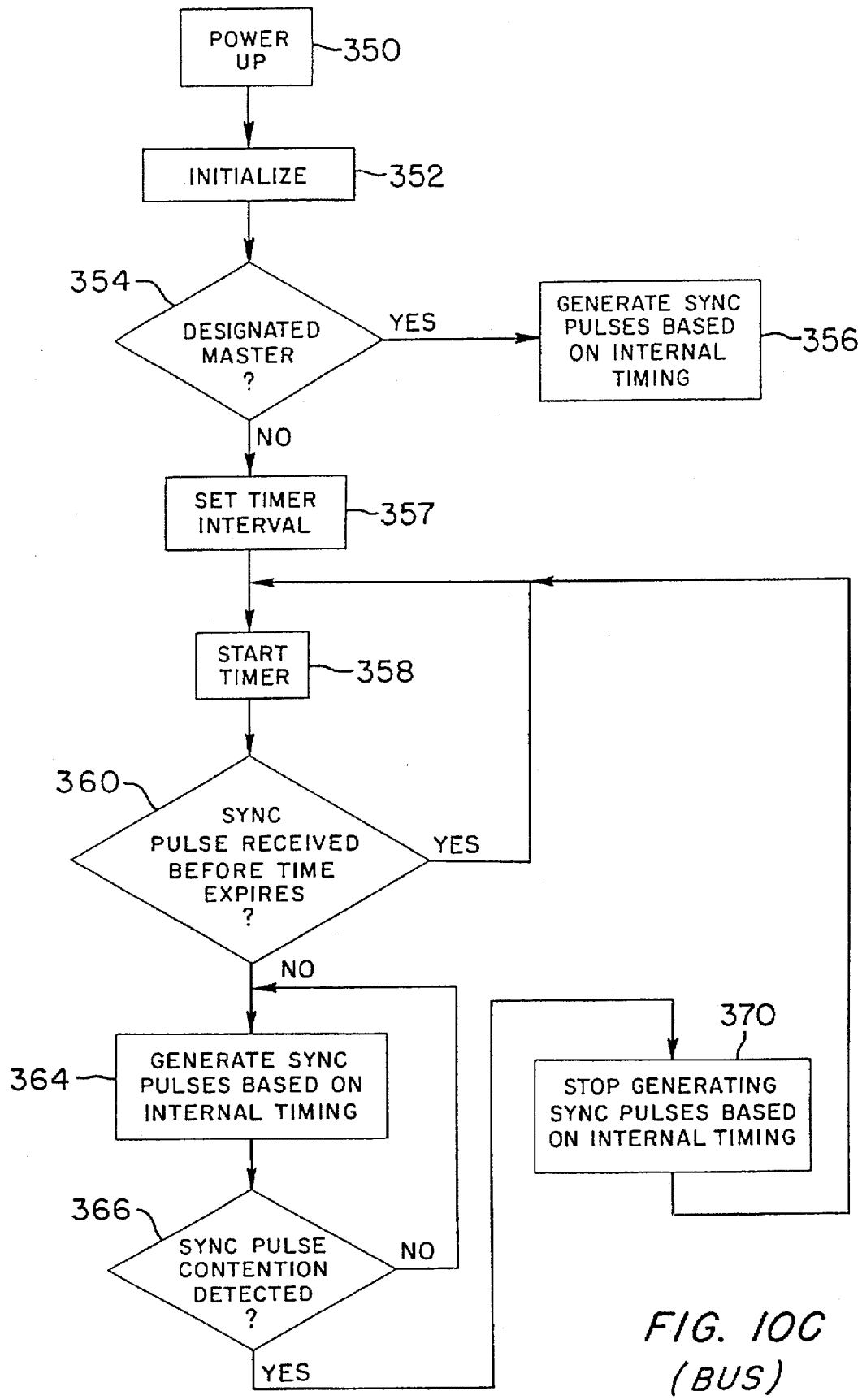
FIG. 10C is a flow chart which illustrates operation of the reader device of FIG. 8C.

Operation of the reader 56', which will now be described with reference to FIG. 10C.

After power is supplied to the reader 56'(step 350), an initialization routine is carried out (step 352). It is then determined, at step 354, whether the reader 56' has been designated to act as a master unit which controls the timing of all of the readers connected to the sync bus. This determination may be made, for example, by receiving an appropriate programming signal through the input device 154, or by determining whether a signal designating the reader 56' as a master unit has been stored in the reader 56' after having previously been input into the reader via the input device 154.

If it was determined at step 354 that the reader has been designated as a master unit, then step 356 follows, at which the reader 56' generates synchronizing signals at regular intervals based upon timing provided by the timing function 208 which is included in the reader 56'. In this case the reader 56' also generates interrogation signals, through interrogation signal generating function 210, in synchronism with the synchronizing signals generated within the reader 56'. In particular, it will be understood that both the synchronizing signals and the interrogation signals are generated in accordance with the timing cycle illustrated in FIG. 2.

The common bus arrangement of FIG. 6B does not permit establishment of priority among back-up units based on proximity to the head of a daisy chain, as provided in the arrangements of FIG. 5 and 6A. Another method of establishing priority among potential back-up master units is therefore required. According to a preferred implementation of the bus-based arrangement of FIG. 6B, priority among the back-up units is established by causing the back-up units to have different respective time-out periods. Specifically, in the procedure of FIG. 10C, if the particular reader is not designated to act as a master unit, then step 357 follows up 354. At step 357, which can be considered a further initialization step, the reader sets the duration of its time-out period, so that it has a different time-out period (either longer or shorter) then the time-out period of any other reader. This may be done, for example, by providing unique addresses for each back-up unit (such as 2, 3, 4, and so forth) and then calculating the time-out period for each reader on the basis of its address. Using the address scheme mentioned above, the reader at address 2 could have a time-out period equal in duration to twice the interrogation signal cycle; the reader at address 3 could have a time-out period equal in duration to three times the interrogation cycle, and so forth.

Following step 357 is step 358, at which the time-out period is commenced. The reader then waits to receive a sync signal via the sync bus 300, and if a sync signal is detected before the end of the reader's time-out period, then the reader generates an interrogation signal in response to receiving the sync signal and the routine then loops back to step 358. So long as the master unit is operating properly, sync signals will be provided on the sync bus 300 by the master unit at regular intervals shorter than the predetermined time-out periods of each of the other readers, and each reader will continue to operate in the slave mode made up of steps 358 and 360. As a result, all of the readers will generate interrogation signals in synchronism with the sync signal produced by the master unit. However, if the master unit fails, then at least one reader will time out, in which case that reader will proceed from step 360 to step 364. At step 364 the reader unit which timed out takes over as master unit and generates sync signals based on its internal timing. These sync signals are transmitted through the sync bus 300 to the other readers so that all of the readers, including the reader acting as back-up master unit, generate interrogation cycles in synchronism with sync signals generated by the back-up unit. Meanwhile, the back-up unit "listens" on the bus for sync pulse contention, which could occur if the master unit goes back into operation or if another unit has also attempted to take over as a back-up master unit. If contention is detected, then the reader proceeds from step 366 to step 370, at which the reader stops generating sync signals based on its internal timing and returns to the loop of steps 358 and 360. Because of the variation in the time-out periods among the readers, any contention can be promptly resolved (i.e., resolved within a few interrogation cycles).

It will be noted that the sync bus 300 of FIGS. 6A and 6B is preferably in the form of a suitable wire or cable connection, but can also be provided in the form of a shared wireless communication channel. It is also contemplated that a number of slave units 56S as shown in FIG. 8B, could be connected to the sync bus 300 in the "pure" bus arrangement of FIG. 6B.

Also, although the synchronization techniques disclosed herein have been described in connection with a network of asset surveillance and tracking system reader devices, the invention is considered to be applicable to other types of electronic devices. For example, the disclosed technique can be used in a disk drive unit made up of a number of disk drives that are to be synchronized in terms of rotational phase. It is also contemplated that readers in an asset tracking system could be synchronized through the local control modules 60 (FIG. 1) that are part of the system. In particular, the local control modules could be synchronized according to the daisy-chain and/or bus techniques disclosed above, and each local control module would then send synchronizing signals to its respective reader units in synchronism with sync signals provided through the daisy-chain or bus synchronizing network used to interconnect the local control modules.

Various changes in the foregoing embodiments and practices may be introduced without departing from the invention. The particularly preferred embodiments described herein are thus intended in an illustrative and not a limiting sense. The true spirit and scope of the invention is set forth in the following claims.

What is claimed is:

1. A method of synchronizing a plurality of electronic devices including a master unit and a plurality of other units, comprising the steps of:

transmitting a synchronizing signal at predetermined intervals from the master unit to at least one of the other units; and in each of at least two of the other units, detecting whether a synchronizing signal is received by the respective other unit within a respective predetermined period of time and changing a mode of operation of the respective other unit if a synchronizing signal is not received by the respective other unit within the respective predetermined period of time, each of said synchronizing signals for initiating an operation of a device which receives the respective synchronizing signal.

2. A method according to claim 1, wherein, if a synchronizing signal is not received by the respective other unit within the respective predetermined period of time, the mode of operation of the respective other unit is changed from a first mode of operation in which the respective other unit transmits a synchronizing signal only in response to receiving a synchronizing signal to a second mode of operation in which the respective other unit transmits a synchronizing signal at predetermined intervals without receiving a synchronizing signal.

3. A method according to claim 1, wherein, if a synchronizing signal is not received by the respective other unit within the respective predetermined period of time, the mode of operation of the respective other unit is changed from a first mode of operation in which the respective other unit does not transmit any synchronizing signal to a second mode of operation in which the respective other unit transmits a synchronizing signal at predetermined intervals.

4. A synchronized network of electronic devices, comprising a plurality of electronic devices and means for interconnecting the devices for transmission of synchronizing signals among the devices, each said synchronizing signals for initiating an operation of a device which receives the respective synchronizing signal, said plurality of electronic devices including:

(a) a master unit for transmitting a synchronizing signal at predetermined intervals to at least one other of said electronic devices, and (b) at least two back-up units each for detecting whether a synchronizing signal is received by the respective back-up unit within a respective predetermined period of time and for transmitting a synchronizing signal at predetermined intervals if a synchronizing signal is not received by the respective back-up unit within the respective predetermined period of time.

5. A network of devices according to claim 4, wherein the master unit transmits the synchronizing signal in response to a timing signal generated within the master unit.

6. A network of devices according to claim 5, wherein said means for interconnecting comprises means for interconnecting the devices in daisy-chain fashion, and each device other than the master unit transmits a synchronizing signal to a next one of said devices in response to receiving a synchronizing signal from a previous one of said devices.

7. A network of devices according to claim 6, wherein each of said devices includes a first port for receiving synchronizing signals, a second port for transmitting synchronizing signals and relay means for selectively providing a short-circuit connection between said first and second ports.

8. A network of devices according to claim 7, wherein each of said devices includes means for transmitting an electronic article surveillance interrogation signal, and each of said devices other than the master unit transmits said interrogation signal in response to receiving a synchronizing signal.

9. A network of devices according to claim 4, wherein said means for interconnecting includes a bus line for connecting all of the devices in common, and the respective predetermined period of time for each of the back-up units is different in duration from the respective predetermined period of time for each other of the back-up units.

10. A network of devices according to claim 9, wherein each of said devices includes means for transmitting an electronic article surveillance interrogation signal, and each of said devices other than the master unit transmits said interrogation signal in response to receiving a synchronizing signal.

11. A synchronized network of electronic devices, comprising:

a master device including means for generating synchronizing signals at regular intervals and an output terminal for outputting the synchronizing signals;

a second device including an input terminal connected to the output terminal of the master device, means for generating a synchronizing signal in response to receipt of a synchronizing signal at the input terminal, and an output terminal for outputting the synchronizing signal generated by the means for generating of the second device; and a third device including an input terminal connected to the output terminal of the second device, means for generating a synchronizing signal in response to receipt of a synchronizing signal at the input terminal of the third device, and an output terminal for outputting the synchronizing signal generated by the means for generating of the third device;

said second device further including means for determining whether a synchronizing signal is received at the input terminal of the second device during a predetermined period of time and for generating synchronizing signals at regular intervals if it is determined that no synchronizing signal is received at the input terminal of the second device during the predetermined period of time, each of said synchronizing signals for initiating an operation of a device which receives the respective synchronizing signal.

12. A synchronized network of electronic devices according to claim 11, further comprising a fourth device having an input terminal connected to the output terminal of the third device, and wherein the third device further includes means for determining whether a synchronizing signal is received at the input terminal of the third device during a respective predetermined period of time and for generating synchronizing signals at regular intervals if it is determined that no synchronizing signal is received at the input terminal of the third device during the respective predetermined period of time.

13. A synchronized network of electronic devices according to claim 12, wherein the second, third and fourth devices are substantially identical to each other.

14. A synchronized network of electronic devices according to claim 13, wherein each of the second, third and fourth devices is an electronic article surveillance reader including means for generating a signal for interrogating an electronic article surveillance marker in response to receipt of a synchronizing signal at the input terminal of the respective device.

15. A synchronized network of electronic devices according to claim 14, wherein the master device is an electronic article surveillance reader including means for generating signals for interrogating an electronic article surveillance marker at regular intervals in synchronism with the synchronizing signals generated by the master device.

16. A synchronized network of electronic devices according to claim 15, wherein the second device and the third device each includes respective means for generating signals for interrogating an electronic article surveillance marker at regular intervals in synchronism with the synchronizing signals generated at regular intervals by the respective device if it is determined that no synchronizing signal is received at the input terminal of the respective device during the respective predetermined period of time.

17. A synchronized network of electronic devices according to claim 16, wherein each of the second and third devices includes relay means for selectively providing a short-circuit connection between the input terminal and the output terminal of the respective device.

18. A synchronized network of electronic devices according to claim 13, further comprising a plurality of further devices connected in daisy-chain fashion to the fourth device, each of the further devices being substantially identical to the second, third and fourth devices.

19. A device for reading an electronic article surveillance marker, comprising:

receive means for receiving a synchronizing signal;

means for generating, in response to receipt of the synchronizing signal by the receive means, an interrogation signal for interrogating the marker;

control means for determining whether a synchronizing signal is received by the receive means during a predetermined period of time; and sync means, responsive to the control means, for generating periodic synchronizing signals at regular intervals, and for generating interrogation signals at regular intervals in synchronism with the periodic synchronizing signals generated at regular intervals, if it is determined by the control means that no synchronizing signal is received by the receive means during the predetermined period of time, each of said synchronizing signals for initiating an operation of a device which receives the respective synchronizing signal.

20. A device according to claim 19, wherein said sync means includes means, responsive to the receive means, for re-transmitting the synchronizing signal received by the receive means.

21. A device according to claim 20, wherein said receive means includes an input port and said sync means includes an output port, the device further comprising relay means for selectively providing a short-circuit connection between said input port and said output port.

22. A device for reading an electronic article surveillance marker, comprising:

receive means for receiving synchronization signals;

interrogation means for generating interrogation signals for interrogating the marker; and sync means for generating synchronization signals;

the device being selectively operated in a first mode of operation in which the interrogation means and the sync means are each responsive to the receive means for respectively generating an interrogation signal and a synchronization signal upon receipt of the synchronization signal by the receive means and a second mode of operation in which the interrogation means and the sync means respectively generate interrogation signals and synchronization signals at regular intervals in synchronism with each other during periods in which the receive means receives no synchronization signals, the device further comprising control means, operatively associated with the receive means, the interrogation means and the sync means, for switching the device between the first and second modes of operation, each of said synchronization signals for initiating an operation of a device which receives the respective synchronization signal.

23. A device according to claim 22, wherein the means for switching includes means for determining whether a synchronization signal is received by the receive means during a predetermined period of time.

24. A device according to claim 22, further comprising:

a first output terminal for outputting said synchronization signal generated by the device in the first mode of operation; and a second output terminal, different from said first output terminal and connected to a synchronization signal bus, for outputting the synchronization signals generated by the device in the second mode of operation.

25. A device according to claim 22, further comprising antenna means for radiating said interrogation signal generated by said interrogation means, and an output port, separate from said antenna means, for outputting said synchronization signals generated by said sync means.

* * * * *